E. F. NIEDECKEN.
MIXING VALVE.
APPLICATION FILED JUNE 16, 1909.

1,001,431.

Patented Aug. 22, 1911.

2 SHEETS—SHEET 1.

Witnesses:
Fred Palm
Chas. L. Goss.

Inventor:
Edward F. Niedecken,
By Winkler Flanders Bottum & Fawsett
Attorneys.

E. F. NIEDECKEN.
MIXING VALVE.
APPLICATION FILED JUNE 16, 1909.
1,001,431.
Patented Aug. 22, 1911.
2 SHEETS—SHEET 2.
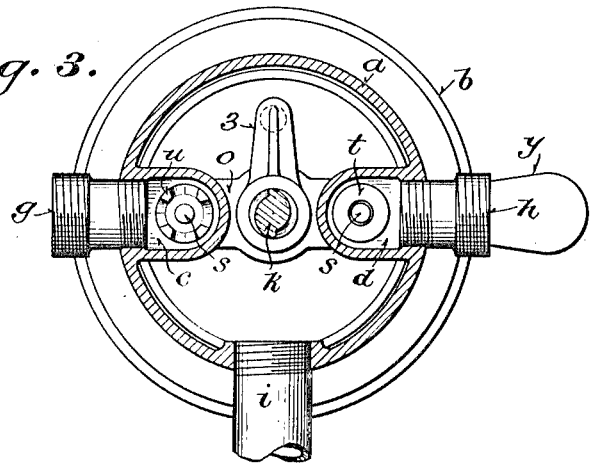
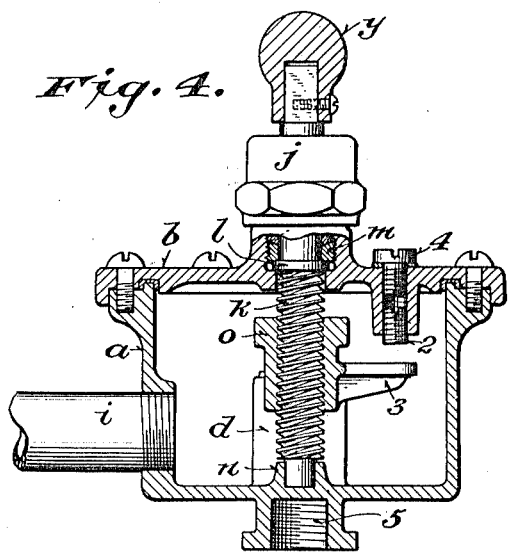
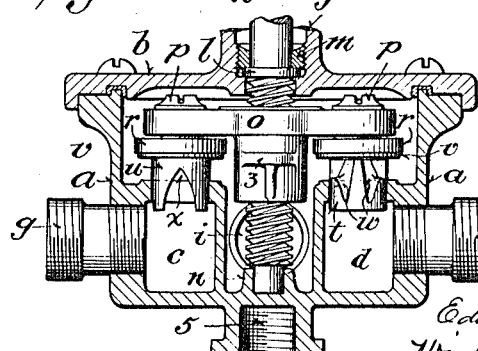
Witnesses:
Inventor:
Edward F. Niedecken,
By Winkler, Flanders, Bottum & Fawsett
Attorneys.

UNITED STATES PATENT OFFICE.

EDWARD F. NIEDECKEN, OF MILWAUKEE, WISCONSIN.

MIXING-VALVE.

1,001,431.  Specification of Letters Patent.  Patented Aug. 22, 1911.

Application filed June 16, 1909. Serial No. 502,430.

*To all whom it may concern:*

Be it known that I, EDWARD F. NIEDECKEN, a citizen of the United States, residing at Milwaukee, in the county of Milwaukee and State of Wisconsin, have invented certain new and useful Improvements in Mixing-Valves, of which the following is a specification, reference being had to the accompanying drawing, forming a part thereof.

The main objects of this invention are to regulate and control the mixture and delivery of fluids, such as hot and cold water, to limit the discharge of hot water so as to prevent scalding, and generally to improve the construction and operation of apparatus of this class.

It consists in the construction, arrangement and combination of parts as hereinafter particularly described and pointed out in the claims.

In the accompanying drawing like characters designate the same parts in the several figures.

Figure 1:
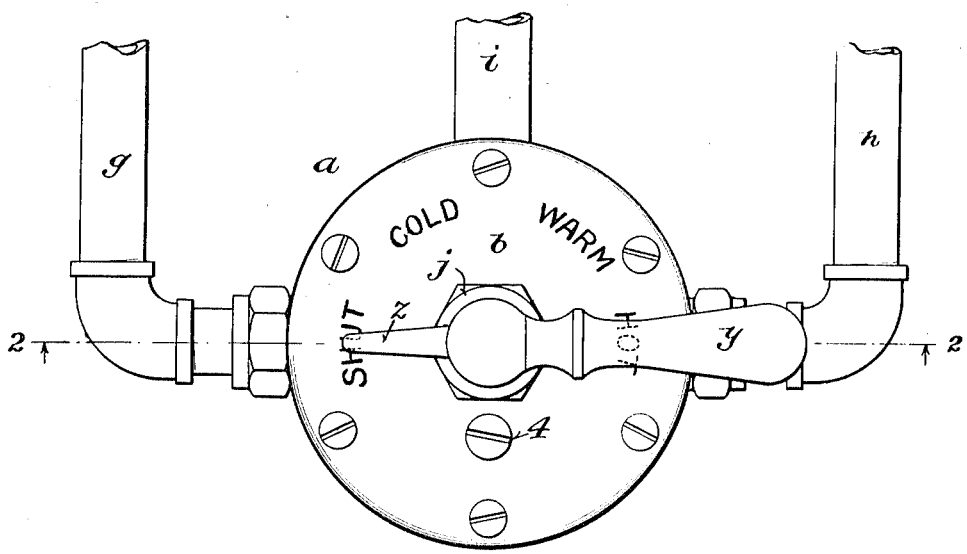
Figure 2:
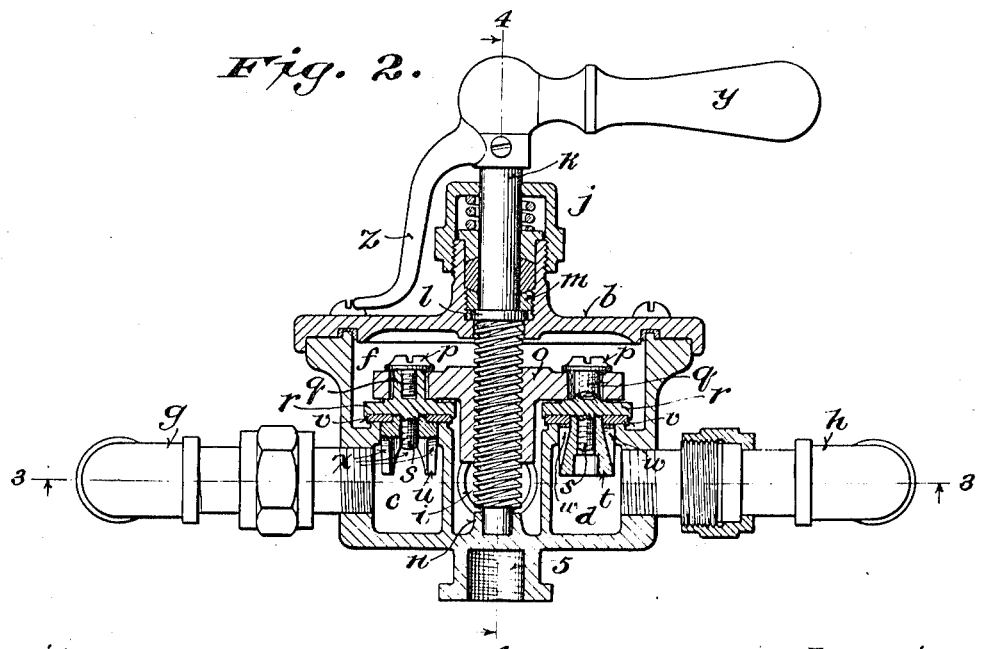

Figure 1 is a front elevation of a valve embodying the invention; Fig. 2 is an axial section on the line 2 2, Fig. 1, cutting the inlet chambers; Fig. 3 is a section transverse to the axis on the line 3 3, Fig. 2; Fig. 4 is a section on the line 4 4, Fig. 2; and Fig. 5 is a section similar to that of Fig. 2, but showing the valve disks removed from their seats.

The valve case $a$, which is preferably made of cylindrical shape open at one end, is provided with a removable cover $b$, and is formed on opposite sides with inlet chambers $c$ and $d$ and with a mixing and outlet chamber $f$, which is connected with the inlet chambers by parallel ports in their upper or outer walls.

Although the valve may be used for regulating and controlling the mixture and delivery of different fluids for different purposes, it is shown and will be described as specially designed to regulate and control the mixture and delivery in variable proportions of cold and hot water for baths and the like. The hot water pipe $g$ is connected with the chamber $c$, the cold water supply pipe $h$ with the chamber $d$, and the delivery pipe $i$ with the intermediate mixing chamber $f$.

The cover $b$ is preferably flanged to fit over the open end of the case, and may be secured thereto with an interposed packing ring or washer by screws as shown. It is provided with a central stuffing box $j$ through which the valve operating stem $k$ passes and in which it is fitted to turn, being held against endwise movement therein by a collar $l$ on the stem, and a ring $m$ threaded in the stuffing box. Within the case the stem is threaded and at its inner or lower end it is provided with a central bearing $n$ between the chambers $c$ and $d$. A yoke $o$ has a central hub or sleeve threaded on the stem $k$ and is formed equidistant therefrom and parallel therewith in alinement with the ports between the chambers $c$ and $d$ and the chamber $f$ with openings in which are loosely fitted and retained by screws $p$, the stems $q$ of valve disks $r$. These disks are formed or provided on the opposite sides from the stems $q$ with threaded stems $s$ on which are screwed graduating plugs $t$ and $u$, with gaskets or packing rings $v$ clamped between them and the disks $r$.

The upper or outer walls of the chambers $c$ and $d$ are formed around the ports therein with raised seats, and the gaskets or packing rings $v$, which are fitted and held in recesses in the disks $r$, are adapted to close tightly against said seats, as shown in Fig. 2. The plugs $t$ and $u$ have a close working fit in said ports, and are formed with reversely tapered peripheral openings or passages $w$ and $x$. In the plug $t$ which regulates the flow of cold water, the openings or passages $w$ diverge toward the disk $r$ and in the plug $u$ which regulates the flow of hot water, the openings or passages $x$ converge toward the disk $r$, terminating at their apexes some distance from said disk.

The stem $k$ is provided outside of the case, with an operating handle $y$ and with an index or pointer $z$ which indicates on the cover, which is graduated or marked for the purpose, as shown in Fig. 1, the several positions of the valves.

To limit the opening of the valve which controls the hot water supply port and thus prevent the delivery of scalding water from the valve, an adjustable stop screw 2 is threaded in the cover and adapted by engagement with a projection 3 from the yoke $o$, to limit the opening movement of the plug $u$. The stop screw 2 is concealed and protected by a cap screw or plug 4, threaded in the cover, a washer or packing ring being interposed between the head of the cap screw or plug to prevent leakage. The valve case may be formed with a threaded socket 5, as shown, for attaching it to a threaded supporting stud or fixture.

In the operation of the valve, the handle $y$ being turned to the right from the shut position in which it is shown in Figs. 1 and 2, first moves the disks $r$ with the packing rings $v$ away from their seats. Cold water is thus admitted at once through the tapered passages $w$ from the inlet chamber $d$ into the outlet chamber $f$, from which it is discharged through the delivery pipe $i$. As the index or pointer $x$ is moved from the point on the cover marked "shut" to the point marked "cold", the flow of cold water is gradually increased by the increased opening of the tapered passages $w$. During this movement of the handle the plug $u$ closes the port between the inlet chamber $c$ and the outlet chamber $f$, and no hot water is admitted to the latter, but as the index is carried beyond the point marked "cold" the apexes of the passages $x$ are exposed in the chamber $f$ and hot water begins to flow into said chamber, where it mingles with the full supply of cold water admitted from the chamber $d$. A supply of slightly warm water is thus delivered from the valve through the pipe $i$.

As the handle is turned farther to the right and the index or pointer $z$ passes from the point marked "cold" to the point marked "warm" the opening of the passages $w$ into the chamber $d$ is gradually restricted, while the opening of the passages $x$ into the chamber $f$ is gradually increased, thereby increasing the proportion of hot to cold water admitted into the mixing chamber $f$ and discharged therefrom through the pipe $i$. As the index or pointer passes from the point marked "warm" to the point marked "hot" the opening of the passages $w$ into the chamber $d$ is gradually reduced, while the opening of the passages $x$ into the chamber $f$ is increased until the projection 3 on the yoke $o$ engages with the stop screw 2, arresting the further movement of the handle and opening of the passages $x$. The hottest water which it is possible to obtain through the valve is now delivered through the pipe $i$.

By the adjustment of the stop screw 2 according to the varying conditions with respect to the supply of hot water, the opening of the passages $x$ may be limited so as to prevent the delivery of scalding water from the pipe $i$.

It will be observed that the movement of the handle $y$ through an arc of about 180 degrees, is sufficient to operate the valves and produce all the desired adjustments thereof, as above explained. Upon turning the handle back to its original position the packing rings are closed tightly against their seats and leakage from the inlet chambers $c$ and $d$ into the mixing and outlet chamber $f$ is stopped. The loose connections between the valve disks $r$ and the yoke $o$ permit the packing rings $v$ to close squarely against their seats, thereby compensating for slight inaccuracies in the construction of the parts and avoiding leakage.

By removing the screws which fasten the cover $b$ to the case $a$ the valves, the yoke connecting them and the operating stem, may be removed bodily with the cover from the case $a$ without disturbing the supply and delivery pipe connections of the case.

Various changes in the details of construction and arrangement of parts may be made without affecting the principle of the valve and without departing from the spirit and scope of the invention.

I claim:

1. In a mixing valve the combination of a case having inlet chambers and a mixing and outlet chamber connected with the inlet chambers by ports, valve-disks adapted to close said ports and provided with plugs fitting into the ports and having reversely tapered peripheral openings, and means for moving said valve disks and plugs axially with relation to the ports which they control.

2. In a mixing valve the combination of a case having inlet chambers and a mixing and outlet chamber connected by ports with the inlet chambers, valves provided with graduating plugs fitting and movable axially in said ports and respectively having peripheral openings the sides of which converge longitudinally in opposite directions, a yoke connecting said valves, an operating handle connected with said yoke and a concealed adjustable stop for limiting the opening of one valve to prevent scalding.

3. In a mixing valve the combination of a case having inlet chambers and a mixing and outlet chamber connected by ports with the inlet chambers, valve disks provided with graduating plugs fitting and movable axially in said ports and respectively having peripheral openings the sides of which converge longitudinally in opposite directions, a yoke connecting said valve disks, a stem journaled in said case and threaded in said yoke, and a handle for turning said stem.

4. In a mixing valve the combination of a case having separate inlet chambers on opposite sides thereof and a mixing and outlet chamber connected by parallel ports with said inlet chambers, an operating stem journaled in said case between and parallel with said ports, a yoke threaded on said stem within the mixing and outlet chamber, valve disks having stems on one side loosely confined in said yoke and threaded stems on the opposite side, plugs screwed on said threaded stems and fitting into said ports and respectively having reversely tapered peripheral openings, and packing rings clamped between said disks and plugs and adapted to be seated around and to tightly close said ports.

5. In a mixing valve the combination of a case having inlet chambers and a mixing and outlet chamber connected by parallel ports with the inlet chambers, axially movable valves having graduating plugs fitting into said ports and arranged to diminish the opening of one port as it increases the opening of the other, a yoke connecting said valves, an operating stem threaded in said yoke and journaled in the case, an adjustable stop threaded in the case and adapted by engagement with said yoke to limit the opening of the valve which controls the hot fluid and a cap covering and concealing said stop.

6. In a mixing valve the combination of a case having inlet chambers, a mixing and outlet chamber connected by ports with the inlet chambers, and a removable graduated cover provided with a stuffing box, axially movable valve disks having graduating plugs fitting into said ports and adapted to diminish the opening of one port as it increases the opening of the other, a stem journaled in the stuffing box of the cover and provided with a handle and an index coöperating with the graduated cover to determine the position of the valve disks, and a yoke connecting said valve disks, and threaded on said stem, the stem, yoke and valve disks being removable bodily with the cover, from the case.

7. In a mixing valve the combination of a case having inlet chambers and a mixing chamber connected by ports with the inlet chambers, valves controlling the flow of fluid through said ports, a yoke connecting said valves, a screw threaded stem for operating said yoke to open and close the valves, and a stop threaded in said case and adjustable toward and from said yoke, the opening movement of which it is adapted to limit.

In witness whereof I hereto affix my signature in presence of two witnesses.

EDWARD F. NIEDECKEN.

Witnesses:
A. J. PAINTER,
CHAS. L. GOSS.